United States Patent
Ahn

(10) Patent No.: US 8,419,053 B2
(45) Date of Patent: Apr. 16, 2013

(54) INCLINED TYPE AIR-BAG CUSHION

(75) Inventor: Taeg Young Ahn, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 49 days.

(21) Appl. No.: 13/089,891

(22) Filed: Apr. 19, 2011

(65) Prior Publication Data

US 2012/0032421 A1 Feb. 9, 2012

(30) Foreign Application Priority Data

Aug. 9, 2010 (KR) .................. 10-2010-0076363

(51) Int. Cl.
*B60R 21/16* (2006.01)

(52) U.S. Cl.
USPC ............................................ 280/732

(58) Field of Classification Search ........... 280/732, 280/730.1, 743.1
See application file for complete search history.

(56) References Cited

U.S. PATENT DOCUMENTS 5,584,508 A * 12/1996 Maruyama et al. ........ 280/743.1
7,207,594 B2 * 4/2007 Igawa et al. .............. 280/730.1

FOREIGN PATENT DOCUMENTS

JP   2005-335652 A   12/2005
JP   2006-88856 A    4/2006

* cited by examiner

*Primary Examiner* — Faye M. Fleming
(74) *Attorney, Agent, or Firm* — Morgan, Lewis & Bockius LLP

(57) ABSTRACT

An inclined type air-bag cushion may include a side panel including a first side panel, and a second side panel which has an area smaller than that of the first side panel and may be placed to be substantially parallel to and spaced apart from the first side panel, and a main panel obliquely connecting and enclosing the first and second side panels to each other to form an inclined contact surface with which a passenger's head may be put in oblique contact, when gas may be supplied in the air-bag cushion.

5 Claims, 6 Drawing Sheets

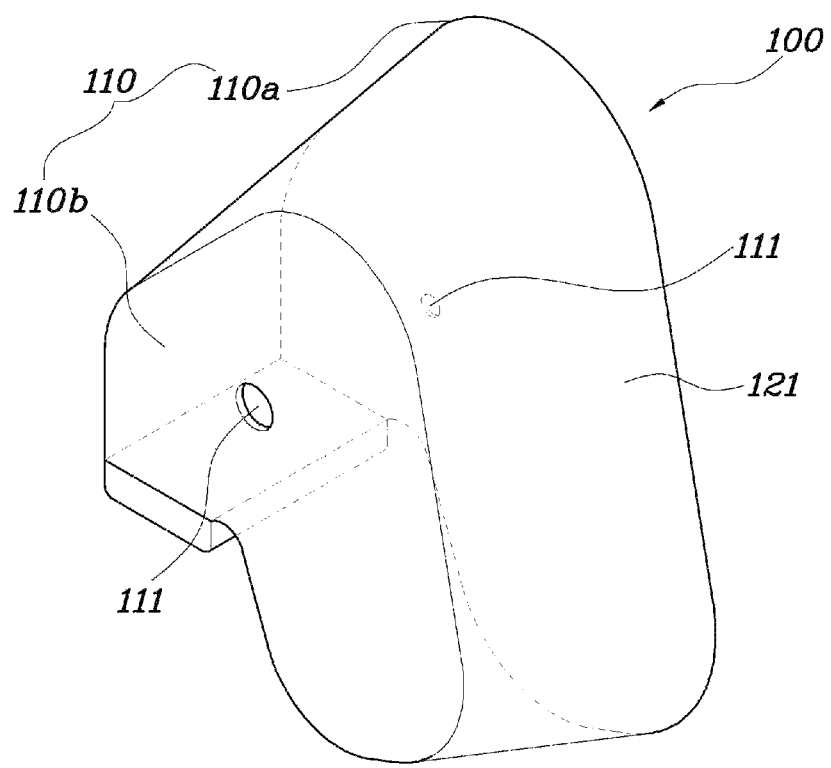

INCLINED TYPE AIR-BAG CUSHION

CROSS-REFERENCE TO RELATED APPLICATIONS

The present application claims priority to Korean Patent Application No. 10-2010-0076363 filed on Aug. 9, 2010, the entire contents of which is incorporated herein for purposes by this reference.

BACKGROUND OF THE INVENTION

1. Field of the Invention

The present invention relates generally to an inclined type air-bag cushion and, more particularly, to an inclined type air-bag cushion, which is constructed so that a contact surface that makes contact with a passenger's head is inclined, thus reducing an injury to his or her neck resulting from the twisting of the neck in the event of a vehicle collision.

2. Description of Related Art

Generally, an air-bag apparatus for a vehicle is constructed so that an air-bag cushion is inflated at high speed in the event of a vehicle collision, thus protecting a driver and a passenger sitting in a passenger seat from the windshield of the vehicle or an object in front.

As shown in FIG. 6, a conventional air-bag apparatus includes an inflator 30 which is mounted to an air-bag housing to supply expansion gas in the event of a vehicle collision, an electronic control unit (ECU) which functions to operate the inflator 30, and an air-bag cushion 10 which is supplied with gas from the inflator 30.

That is, in the event of a vehicle collision, when the vehicle collision is detected by a collision sensor, the control unit uses the impact strength to determine whether the inflator 30 should be operated or not. If the inflator 30 is operated by the control unit, the inflator 30 burns a gas forming agent, and thereafter injects a large amount of gas through an inflator hole into the air-bag cushion 10, thus inflating the air-bag cushion 10.

However, the conventional air-bag apparatus is problematic in that the front of a passenger's head comes into contact with the air-bag cushion which is immediately and suddenly inflated in the event of a vehicle collision, so that his or her head is excessively twisted by the inflated air-bag cushion, and thus an injury to the neck occurs.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide an inclined type air-bag cushion, which is capable of reducing an injury to a passenger's neck resulting from the twisting of the neck in the event of a vehicle collision, and satisfying neck injury performance standard of the enhanced North American New Car Assessment Program (NCAP).

In an aspect of the present invention, the inclined type air-bag cushion may include a side panel including a first side panel, and a second side panel which may have an area smaller than that of the first side panel and may be placed to be substantially parallel to and spaced apart from the first side panel, and a main panel obliquely connecting and enclosing the first and second side panels to each other to form an inclined contact surface with which a passenger's head may be put in oblique contact, when gas may be supplied in the air-bag cushion.

An inclination angle between the first and second side panels may range from approximately 10 degrees to approximately 20 degrees.

An edge of each of the first and second side panels may be connected to an edge of the main panel by sewing.

The first and second side panels may include panel vent holes, respectively, the panel vent hole of the first side panel being formed to be smaller than the panel vent hole of the second side panel.

The inclined type air-bag cushion may further include at least a partition wall dividing the air-bag cushion in a widthwise direction thereof with a predetermined distance so that the air-bag cushion may be inflated sequentially from the first side panel to the second side panel when gas may be supplied, the at least a partition wall comprising a partition-wall vent hole to allow the supplied gas to flow from the first side panel to the second side panel, wherein the gas may be supplied to a space formed between the second side panel and an abutting partition wall.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 4 is a perspective view showing an inclined type air-bag cushion according to various exemplary embodiments of the present invention.

Figure 1:
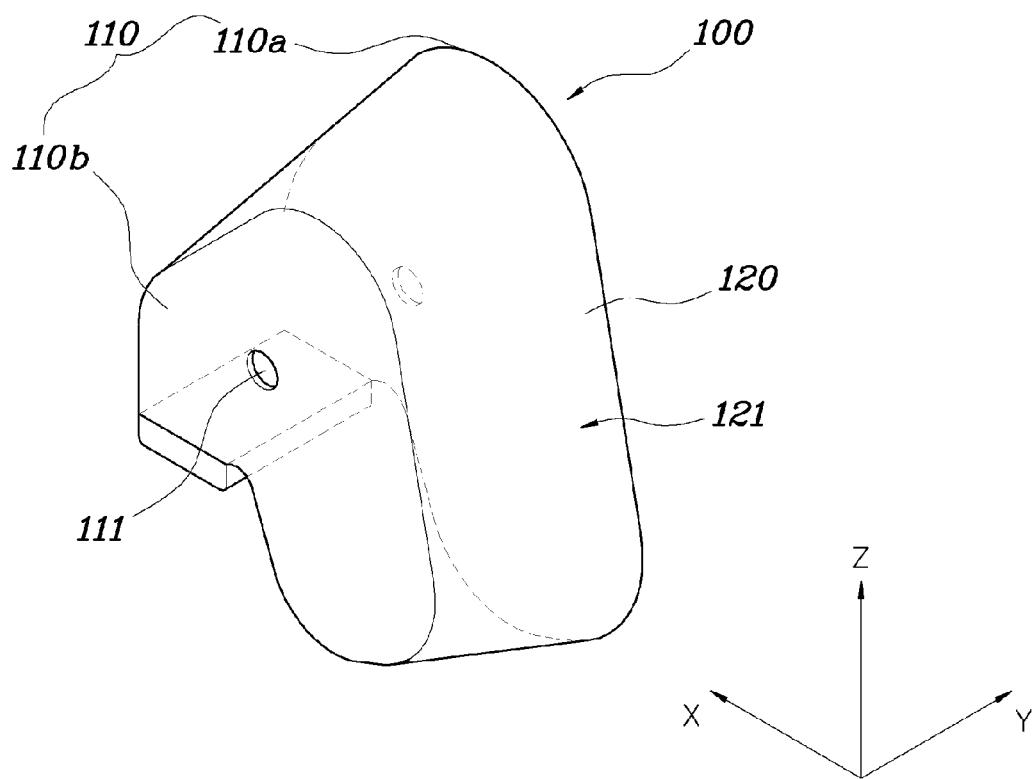
FIG. 1 is a perspective view showing an inclined type air-bag cushion according to various exemplary embodiments of the present invention.
Figure 2:
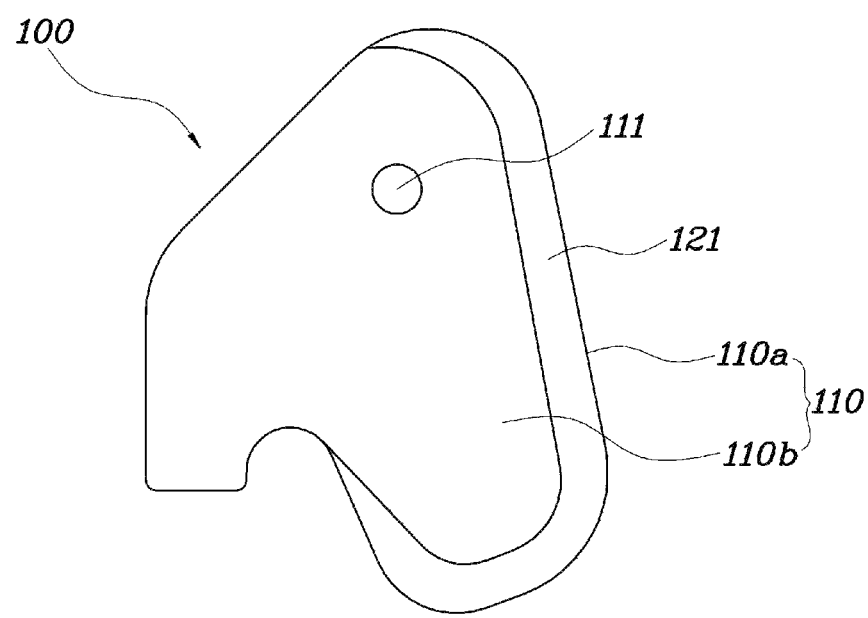
FIG. 2 is a side view showing a side of the inclined type air-bag cushion according to the various exemplary embodiments of the present invention.
Figure 3A:
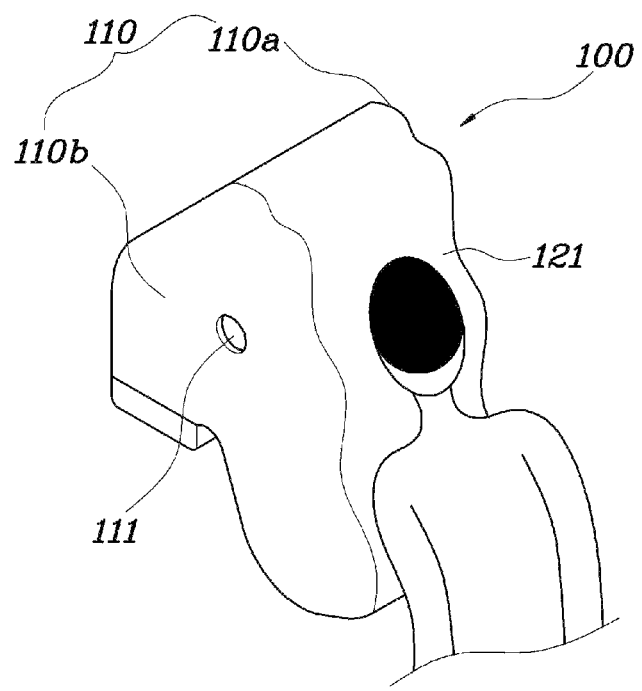
FIGS. 3A and 3B are views showing the process of developing the inclined type air-bag cushion according to the various exemplary embodiments of the present invention.
Figure 3B:
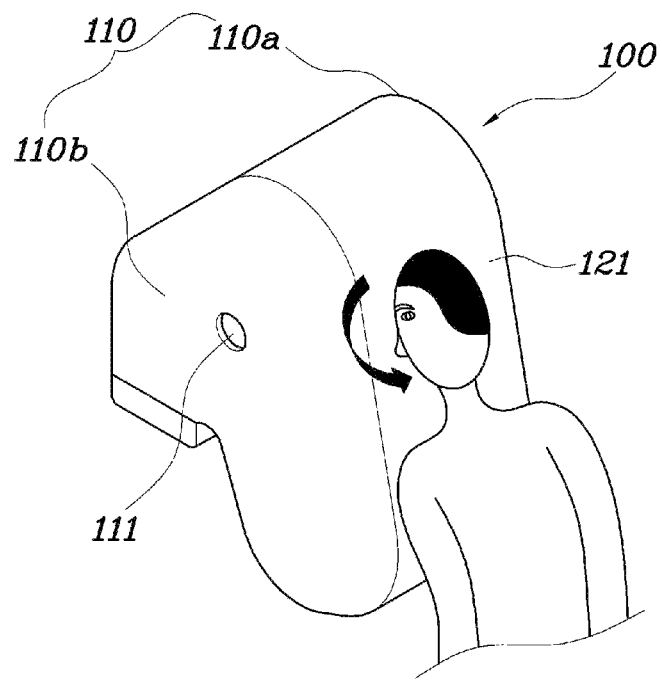

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Hereinafter, the preferred embodiments of the present invention will be described in detail with reference to the accompanying drawings.

As shown in FIGS. 1 to 3B, an air-bag cushion 100 according to an exemplary embodiment of the present invention is constructed so that, when it is inflated in the event of a vehicle collision, a passenger's head is put in oblique contact with an inclined contact surface 121, thus reducing an injury resulting from the twisting of the neck.

Such an air-bag cushion 100 includes a pair of side panels 110 which have different areas, and a main panel 120 which obliquely connects the side panels 110 to each other.

In detail, side panels 110 according to the first embodiment are panels that define the side surfaces of the air-bag cushion 100, and include a first side panel 110a which has a predetermined area and forms one side of the air-bag cushion 100, and a second side panel 110b which has an area smaller than that of the first side panel 110a and forms the other side of the air-bag cushion 100.

Here, the first and second side panels 110a and 110b are provided with panel vent holes 111, respectively. The panel vent holes 111 function to discharge some of gas from the air-bag cushion 100 when the air-bag cushion 100 is inflated, thus controlling gas pressure in the air-bag cushion 100 to a predetermined pressure.

Further, the first and second side panels 110a and 110b are parallel to and spaced apart from each other. It is preferable that an inclination angle between the first and second side panels 110a and 110b range from 10 degrees to 20 degrees. If the inclination angle is less than 10 degrees, the angle at which the neck is rotated by the air-bag cushion 100 when the air-bag cushion 100 is inflated in the event of a vehicle collision is very small. In contrast, if the inclination angle is greater than 20 degrees, the angle at which the neck is rotated by the air-bag cushion 100 is excessively increased, thus causing an injury due to the excessive rotation of the neck.

The first and second side panels 110a and 110b are connected at edges thereof to each other via the main panel 120. The main panel 120 is connected to the edges of the first and second side panels 110a and 110b by sewing.

Particularly, the main panel 120 which faces the front of a passenger at the time of the inflation of the air-bag cushion 100 forms an inclined contact surface 121 with which the head of the passenger is put in oblique contact. The inclined contact surface 121 is formed because of a difference in area between the first and second side panels 110a and 110b, and forces the passenger's neck to be rotated by a predetermined angle when the air-bag cushion 100 inflates, thus reducing the injury of the neck resulting from the excessive twisting of the neck.

As shown in FIG. 4, according to the second embodiment, panel vent holes 111 are formed, respectively, in a first side panel 110a and a second side panel 110b. Here, the panel vent hole of the first side panel 110a is formed to be smaller than the panel vent hole of the second side panel 110b, thus allowing the rotation of the neck to be smoothly performed when an air-bag cushion 100 is inflated.

That is, when the air-bag cushion 100 is inflated, a smaller amount of gas is discharged through the panel vent hole 111 of the first side panel 110a, and a larger amount of gas is discharged through the panel vent hole 111 of the second side panel 110b. Here, since the portion of the air-bag cushion 100 around the first side panel 110a is inflated faster than is the portion of the air-bag cushion 100 around the second side panel 110b, the rotation of the passenger's neck can be smoothly carried out.

Figure 5:
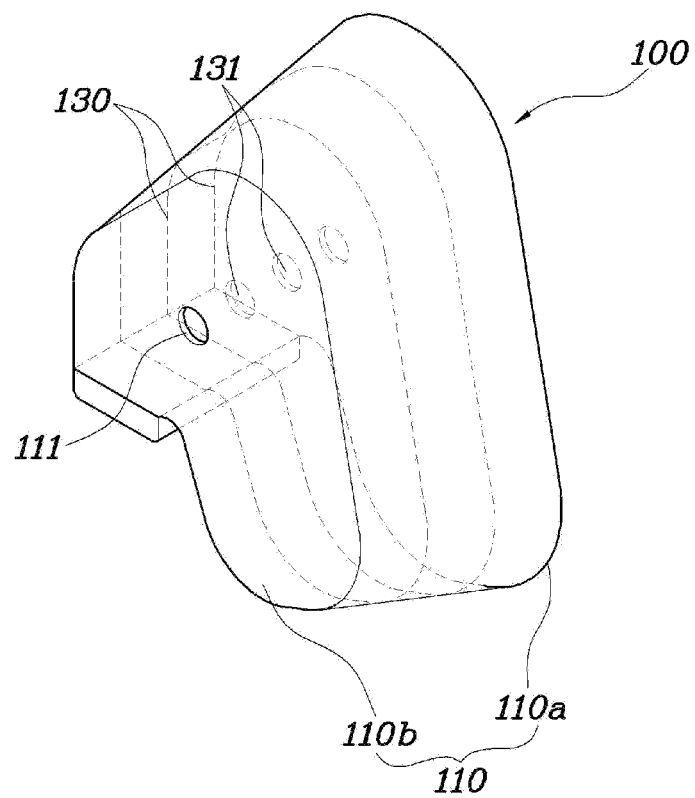
FIG. 5 is a perspective view showing an inclined type air-bag cushion according to various exemplary embodiments of the present invention.
Figure 6:
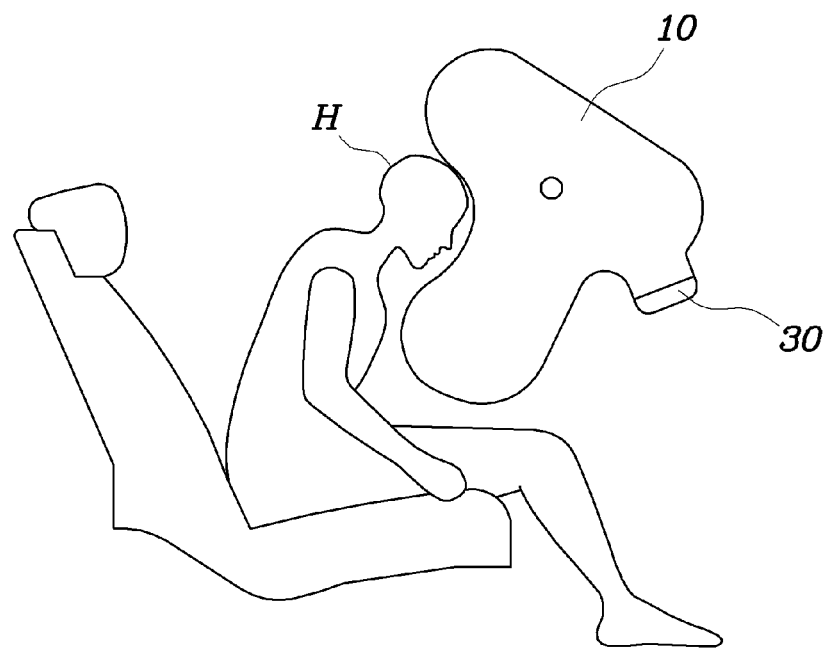
FIG. 6 is a side view vehicle showing the operation of a conventional air-bag apparatus in the event of a vehicle collision.

As shown in FIG. 5, according to the third embodiment, an air-bag cushion 100 of the present invention may be provided with partition walls 130 which are placed in a widthwise direction thereof in such a way as to be spaced apart from each other. The partition walls 130 divide the air-bag cushion 100 in the widthwise direction thereof, thus allowing gas supplied from an inflator to sequentially flow from a first side panel 110a to a second side panel 110b. To this end, the partition walls 130 are provided with a plurality of partition-wall vent holes 131.

That is, the plurality of partition walls 130 divides the air-bag cushion 100 into a plurality of chambers. Among the chambers, the inflator for supplying gas is connected to a chamber which is adjacent to the first side panel 110a. Thus, when the gas has been supplied into the air-bag cushion 100, the supplied gas flows sequentially from the first side panel 110a to the second side panel 110b, via the partition-wall vent holes 131. The air-bag cushion 100 may be inflated sequentially in a direction from the first side panel 110a to the second side panel 110b. Thereby, the neck can be rotated smoothly, so that an injury to a passenger's neck resulting from the excessive twisting of the neck can be effectively reduced.

As described above, the present invention uses some of collision energy transmitted to the neck to rotate the neck, so that an injury resulting from the twisting of the neck can be reduced. Especially, the enhanced North American NCAP uses the rotary moment ($M_Y$) of the neck in the Y-axis direction (that is, the widthwise direction of a vehicle) as the factor that determines the neck injury criterion, and the rotary moment ($M_Z$) of the neck in the Z-axis direction (that is, the height direction of the vehicle) has no relation to the neck injury criterion. Thus, as in an exemplary embodiment of the present invention, if the twisting of the neck in the Y-axis direction is reduced ($M_Y$: reduction) by rotating the neck in the Z-axis direction at a predetermined angle ($M_Z$: increase), the injury to the neck is reduced, so that dissatisfaction with neck injury performance can be prevented.

According to an exemplary embodiment of the present invention, the following remarkable effect can be achieved.

First, the inclined type air-bag cushion according to an exemplary embodiment of the present invention provides the advantage in that the contact surface which is in contact with the head during the inflation of the air-bag cushion is constructed to be inclined, so that the movement of the neck can be easily controlled to satisfy neck injury performance standard of the enhanced North American NCAP.

Second, the inclined type air-bag cushion according to an exemplary embodiment of the present invention provides the advantage in that it can early accomplish the standard of the enhanced North American NCAP, so that the number of real vehicle tests and sled tests may be reduced, and thus a reduction in development costs is achieved.

Third, the inclined type air-bag cushion according to an exemplary embodiment of the present invention provides the advantage in that some of the collision energy transmitted to the neck is used to rotate the neck, so that an injury resulting from the twisting of the neck can be reduced.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An inclined type air-bag cushion, comprising:
  a side panel including a first side panel, and a second side panel which has an area smaller than that of the first side panel and is placed to be substantially parallel to and spaced apart from the first side panel;
  a main panel obliquely connecting and enclosing the first and second side panels to each other to form an inclined contact surface with which a passenger's head is put in oblique contact, when gas is supplied in the air-bag cushion; and
  at least a partition wall disposed between the first side panel and the second side panel and dividing an inner space of the air-bag cushion in a widthwise direction thereof with a predetermined distance so that the air-bag cushion is inflated sequentially from the first side panel through the at least a partition wall to the second side panel when gas is supplied;
  wherein each of the at least a partition wall includes a partition-wall vent hole to allow supplied gas to flow through the at least a partition wall to the second side panel.

2. The inclined type air-bag cushion as set forth in claim 1, wherein an inclination angle between the first and second side panels ranges from approximately 10 degrees to approximately 20 degrees.

3. The inclined type air-bag cushion as set forth in claim 1, wherein an edge of each of the first and second side panels is connected to an edge of the main panel by sewing.

4. The inclined type air-bag cushion as set forth in claim 1, wherein the first and second side panels comprise panel vent holes, respectively, the panel vent hole of the first side panel being formed to be smaller than the panel vent hole of the second side panel.

5. The inclined type air-bag cushion as set forth in claim 1, wherein the gas is supplied to a space formed between the second side panel and an abutting partition wall.

\* \* \* \* \*